*United States Patent* [19]

Cantoni

[11] Patent Number: 4,815,094
[45] Date of Patent: Mar. 21, 1989

[54] MULTIPLY FOLDED LASER SYSTEMS

[75] Inventor: Armando Cantoni, Escondido, Calif.

[73] Assignee: California Laboratories, Inc., Carlsbad, Calif.

[21] Appl. No.: 52,977

[22] Filed: May 22, 1987

[51] Int. Cl.$^4$ ............................................. H01S 3/081
[52] U.S. Cl. ........................................ 372/93; 372/34; 372/35; 372/64; 372/66; 372/92; 372/107; 372/108
[58] Field of Search ............... 372/93, 94, 92, 107, 372/108, 55, 64, 66, 99, 34, 35

[56] References Cited

U.S. PATENT DOCUMENTS

| | | | |
|---|---|---|---|
| 3,361,987 | 1/1968 | De Maria | 331/94.5 |
| 4,169,251 | 9/1979 | Laakmann | 331/94.5 G |
| 4,429,398 | 1/1984 | Chenausky et al. | 372/64 |
| 4,438,514 | 3/1984 | Chenausky et al. | 372/64 |
| 4,493,087 | 1/1985 | Laakman et al. | 372/64 |

FOREIGN PATENT DOCUMENTS 2033648 10/1979 United Kingdom .

*Primary Examiner*—William L. Sikes
*Assistant Examiner*—Georgia Y. Epps
*Attorney, Agent, or Firm*—Arnold S. Weintraub; Gerald R. Black

[57] ABSTRACT

The laser resonator of the present invention has multiply folded optical paths in an extended region by utilizing a set of front surface reflecting elements. The resonator can be used in a gas laser oscillator or amplifier, in either continuous wave mode or pulsed mode. This optical path is folded into larger domains within a polygonal area of the laser cavity, thereby achieving increasingly longer laser paths without a corresponding increase in the number of folding elements. The resulting domains fully cover the plane with a grid of evenly spaced and intersecting optical paths. In one embodiment, the invention consists of a waveguide gas laser system with a ceramic block having a multiply folded optical path of intersecting waveguide channels cut into the block. The reflecting mirrors of the laser resonator are integrally attached to the ceramic block, enhancing the durability of the laser resonator and reducing the size. Since the laser medium is gaseous, the matching of the refractive indices is not required.

31 Claims, 4 Drawing Sheets

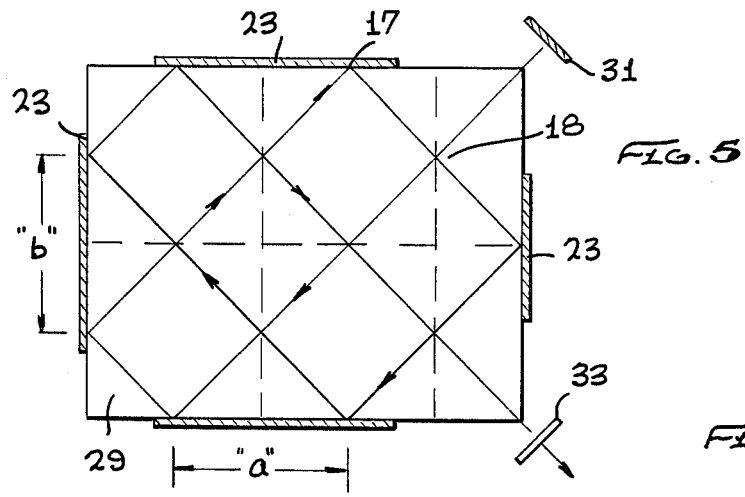
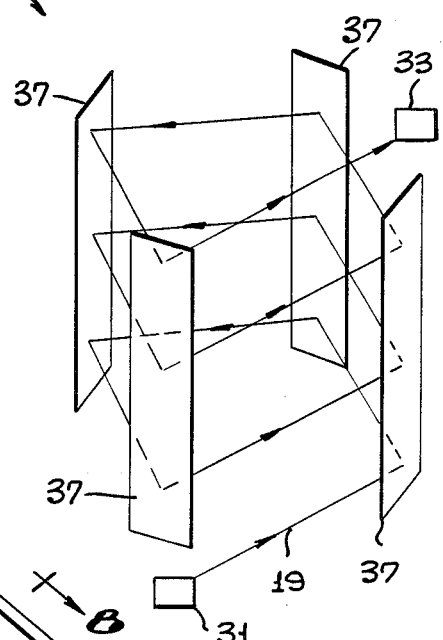
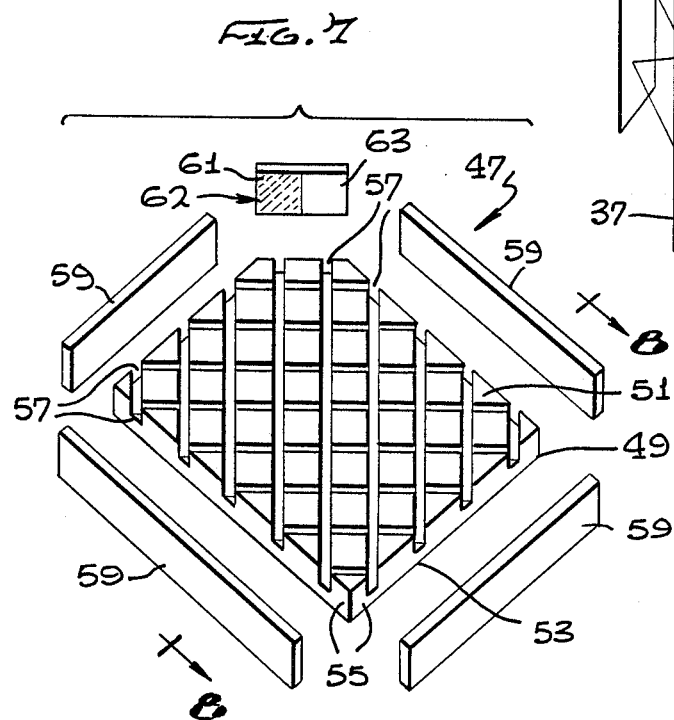

MULTIPLY FOLDED LASER SYSTEMS

TECHNICAL FIELD

This invention relates to a laser resonator, and more particularly to gas laser systems in which the optical path of the laser radiation is lengthened by using a multiply folded resonator.

BACKGROUND ART

Commercially available gas lasers offer limited power output capabilities per unit length. Typically, the upper limit for a CO2 laser is about 0.6 watts/cm. Hence, when a CO2 laser is used in applications requiring high output powers (about 30 watts), resonator lengths are on the order of 50 cm. The resulting system architectures are mechanically complex, are not rugged or reliable, and have restricted portability. When waveguide lasers are used with a ceramic bore material, long resonator lengths imply considerable manufacturing difficulties because of tight machine tolerances, poor yields, and high production costs.

Chenausky et al, in U.S. Pat. Nos. 4,429,398 and 4,438,514, solves the length problem by using mirrors to fold the optical path, achieving some reduction in overall resonator length at the expense of a modest increase in width. In the '398 patent two parallel waveguides are optically coupled by a pair of folding mirrors within a common block. This configuration results in a finite amount of diffraction losses that can be reduced but not eliminated by minimizing the distance traveled in free space. The '514 patent shows a progressive improvement which uses a third diagonal waveguide that connects, end-to-opposite end, the two parallel waveguides. Since the waveguides are serially connected, the laser cavity will have a series of parallel waveguides, a Z-folded waveguide, or a ring arrangement.

De Maria, in U.S. Pat. No. 3,361,987, increases active gain length in a polysided folded laser path in resonators employing solid or liquid amplifier media, with a continuously folded optical path, using total internal reflection. Nakagome et al in U.K. Application No. 2,033,648A employs a similar configuration for achieving long optical paths in semiconductor light amplifiers. The use of total internal reflection by De Maria and Nakagome requires that the refractive indices of the laser medium and the matching medium be selected to achieve the proper angle of reflection. The reflecting medium may surround the laser medium, or may be deposited on the end faces of a solid medium. De Maria suggests the use of a ruby laser element immersed in liquid oxygen. The required index matching significantly increases the difficulty of manufacturing and operating the laser. In gas lasers with the index of refraction differing from unity by a few parts per million, total internal reflection cannot be used as an optical path folding technique.

Reduction in resonator lengths can be achieved by allowing resonator cross-sections to grow proportionately to maintain a constant volume of lasing medium. However, where the laser circuitry cross-section cannot grow past an upper limiting size, such as the capillary bore in HeNe lasers or small channels in waveguide CO2 lasers, the standard technique to reduce length has been to divide the laser resonator into smaller segments and to connect the segments serially with mirrors or prisms.

Successful implementation of laser-based systems can greatly benefit from a drastic reduction in laser resonator size. In particular, overall laser cavity length appears to be the limiting parameter. Virtually all applications that require portability and ruggedness are enhanced by a reduction in total cavity length.

SUMMARY OF THE INVENTION

It is the primary object of this invention to create a compact and rugged gas laser resonator with dramatic reductions in the overall resonator size by multiply folding the resonator.

It is another object of the invention to eliminate the requirement for total internal reflection in a multiply folded laser medium. Still another object is to minimize the alignment problems of a multiply folded laser path.

These objects have been met with a technique for generating multiply folded laser paths in an extended region of a laser resonator, whereby path segments are connected to one another by a set of front surface reflecting elements located along the resonator perimeter. The laser resonator can be used in either a gas laser oscillator or amplifier, and in either pulsed or continuous wave mode. Moreover, this resonator involves a system of stacking, which enables the assembly of minims (unit tiles) containing the folded paths into larger domains. The mirrors preferably surround the minims and are arranged in a substantially rectangular configuration. Increasingly longer laser paths are achieved without a corresponding increase in the number of folding elements, but only by extending the length of the folding elements. The resulting domains fully cover the plane with a grid of evenly spaced and intersecting optical paths.

These principles are preferably incorporated into a waveguide gas laser system having a ceramic block and a multiply folded optical path of intersecting waveguides. The reflecting mirrors of the laser resonator may be integrally attached to the ceramic block, enhancing the durability of the laser resonator and reducing its size. Alignment problems may be further minimized by the use of a closed loop optical path, in which the output coupler and reflecting mirror at the opposite end of the optical path are on adjacent areas of a single optical piece.

The novel features which are believed to be characteristic of the invention as to the multiply folded laser resonator and the method of lengthening the optical paths together with further objects and advantages thereof, will be better understood from the following description in connection with the accompanying drawings in which the presently preferred embodiments of the invention are illustrated by way of example. It is expressly understood, however, that the drawings are for purposes of illustration and description only, and are not intended as a definition of the limits of the invention.

BRIEF DESCRIPTION OF THE DRAWINGS

FIG. 5 is another embodiment of a stacked, rectangular, open loop configuration.

FIG. 6 is a three dimensional, rectangular open loop configuration.

FIG. 7 is a segmented perspective view of a rectangular, two-dimensional, laser resonator.

DETAILED DESCRIPTION OF THE INVENTION

Figure 1A:
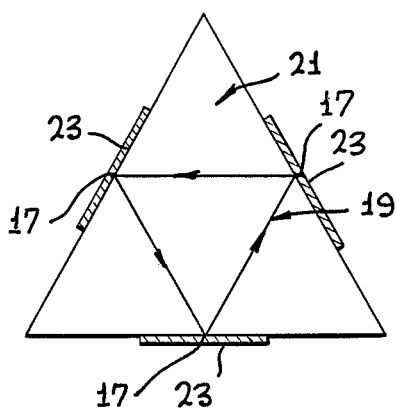
FIG. 1A is a closed loop minim in the shape of an equilateral triangle.

FIG. 1A is a simple surface element of least surface area (minim) 21 in the shape of an equilateral triangle. Minim 21 carries optical path 19 through three mirrors 23 with nodes 17 located at the juncture of optical path 19 and mirrors 23. If the spacing between nodes 17 is "a", the overall path length is "3a", and minim 21 has a perimeter of "6a".

Figure 2:
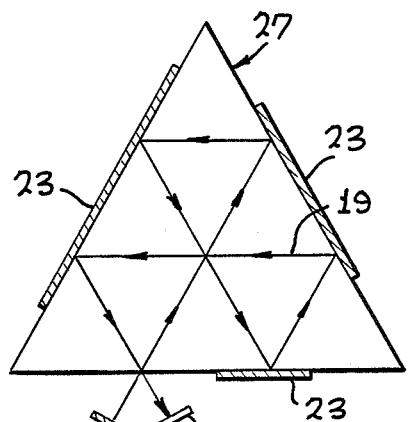
FIG. 2 is a stacked, closed loop configuration arranged as an equilateral triangle.

FIG. 2 is a module of stacked minims 27 in the shape of an equilateral triangle, having total reflector 31 and partial reflector 33 located at the same node, forming a closed loop optical path. By stacking the minims in this manner, optical path 19 is lenghtened compared with the single minim configuration of FIG. 1, and is equal to the perimeter of stacked minim 27. The overall path length in stacked triangles is limited to the perimeter of stacked minim 27. While it is possible to use triangular minims to generate folded optical paths in a plane, the only way to obtain increasingly longer optical paths in two-dimensional regions is by increasing the overall size of the module.

Figure 1B:
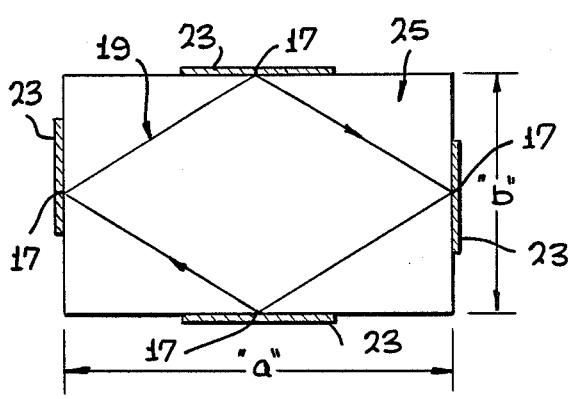
FIG. 1B is a closed loop minim in the shape of a rectangle.

FIG. 1B is a single minim 25 in the shape of a rectangle. Minim 25 carries optical path 19 through four mirrors 23 again with nodes 17 located at the juncture of optical path 19 and mirrors 23.

Figure 3A:
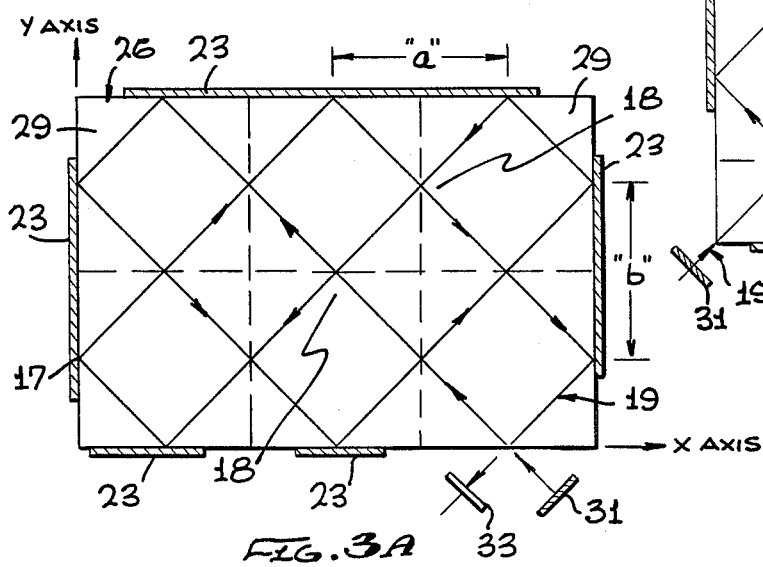
FIG. 3A is a stacked, rectangular, closed loop configuration.

With reference to FIG. 3A, module 26 is obtained by stacking six square minims 29 in three columns of two rows each. Internal reflections 18 are intersections of optical path 19 with itself. The resulting intersecting grid of multiply folded optical paths can be uniquely defined by four operational parameters: "i" is the number of nodes along one edge of the module (three are shown along the x-axis in FIG. 3A); "j" is the number of nodes along an orthogonal edge of the module (two are shown along the y-axis in FIG. 3A); "a" is the spacing between nodes along the "i" edge; and "b" is the node spacing along the "j" edge. The resulting module is classified by specifying "i" and "j", and its size can be scaled by a choice of grid parameters "a" and "b". Hence, the configuration in FIG. 3A is designated as M(3,2), where index i=3, and index j=2.

Figure 3B:
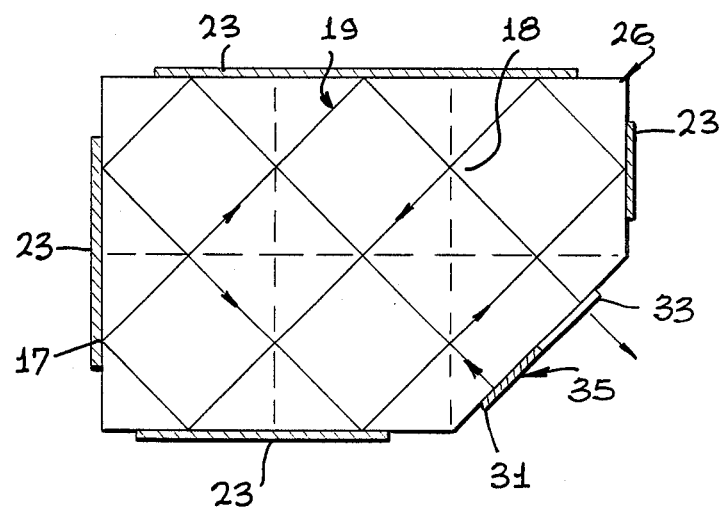
FIG. 3B is another embodiment of a stacked, rectangular, closed loop configuration.

In a stacked closed loop configuration such as shown in FIG. 3A, total reflector 31 and partial reflector 33 are located at the same node. The most effective stacking is a closed loop, "quasi-square" configuration, where one of the corners is removed to provide an entrance and an exit for optical path 19, as shown in FIG. 3B. The "quasi-square" is preferred from a functional point of view, i.e. a module having indices which differ by plus or minus one, such as M(3,4) or M(5,4). When the optical path is multiply folded in a "quasi-square," a given path length has a minimum number of nodes. When used as a laser resonator, module 26 may have any polygonal shape, but use of rectangular folding patterns will permit the closest packing of optical paths in a given area. It has been found that the best "quasi-square" arrangement for the fold mirrors is 45 degree reflections (square minims were a=b).

Single optical substrate 35 may be "split coated" to incorporate both total reflector 31 and partial reflector 33, and installed in a single gimbal mount for proper alignment tuning to the waveguide grid, as shown in FIG. 3B. Substrate 35 is located normal to incident segments of optical path 19. The use of a single optical substrate 35 permits lower cost optics, since only one mount is needed. Alignment is easier, since partial reflector 33 and total reflector 31 need not be independently aligned. Waveguide lasers with plano-plano structures are suggested, since flat reflector elements are preferred in this approach.

Figure 4:
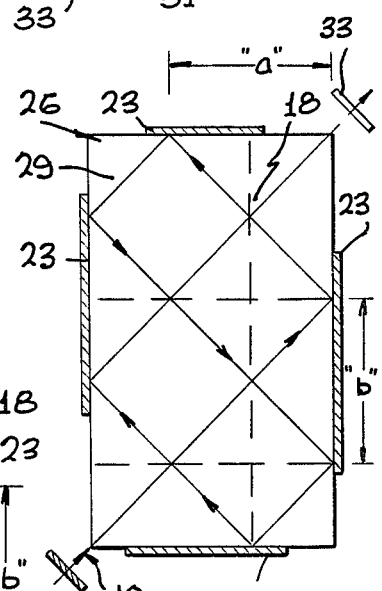
FIG. 4 is a stacked, rectangular, open loop configuration.

Open loop configurations, wherein partial reflector 33 and total reflector 31 are located at different nodes are depicted in FIG. 4, which is designated as M(1,5, 2.5), and FIG. 5, which is designated as M(2.5, 2). When partial reflector 33 is located in one corner, and total reflector 31 is located in the opposite corner (see FIG. 4) an optical axis is perserved between the entrance and the exit channels, with an offset defined by channel spacing. This is the preferred configuration for use as a single pass amplifier, since the output beam is parallel to the input beam. When it is necessary to introduce special optical elements for use in the resonator, such as prisms or gratings for wavelength control, piezoelectric elements for cavity control, or intracavity electro or acousto-optic elements, or total or partial reflectors with finite radii of curvature, open loop configurations that allow for independent mounting for such elements are preferred.

The set of acceptable closed loop configurations are generated by stacking minus to yield modules defined by a choice of integer values for indices "i" and "j" which do not share least common denominators. Thus, for example, M(4,5) is acceptable, but M(4,6) is not, since the integers 4 and 6 are both divisible by 2.

Similar patterns can be generated for open loop configurations by setting either "i", "j," or both equal to half integers; such as M(1.5, 2) or M(1.5, 2.5).

The module parameters "a", "b", "i", and "j" can be used to define the following laser parameters in two-dimensional grids:

| LASER PARAMETER | SYMBOL | EXPRESSION |
| --- | --- | --- |
| Laser Dimensions | X,Y | ia, jb |
| Total Path Length | L | 2ij square root (a squared + b squared) |
| Open Loop | | |
| Number of Node Reflections | R | 2(i + j − 1) |
| Number of Internal Crossings | C | (2i − 1) × (2j − 1)/2 |
| Closed Loop | | |
| Number of Node Reflections | R | 2(i + j) |
| Number of Internal Crossings | C | i(j − 1) + j(i − 1) |

In closed loop configurations, no provision has been made in these equations for a cutaway corner.

A resonator can be designed by selecting values for these parameters and by solving the above expressions. For example, a path length (L)=50 cm may be selected to minimize the total number of nodes. This is important in applications to systems with low intrinsic gain, since each node introduces losses due to less than perfect mirror reflectivity. A closed loop "quasi-square" is selected where i=2, and j=3. If square minims (a=b) are used, then "a" is calculated to be 2.95 cm, for the node spacing, A=52 square cm, with X=5.89 cm, and Y=8.84 cm.

Conversely, if the path length in a given surface area is to be maximized for a laser with high intrinsic gain, regardless of the number of nodes, a different approach is used. The parameters selected are A=52 square cm (the same as the previous example), i=4, j=5 (again a closed loop, "quasi-square" geometry), and again square minims are used (a=b). Then "a" is calculated to be 1.61 cm for the node spacing, X=6.45 cm, and Y=8.06 cm, producing a path length (L) of 91 cm.

FIG. 6 shows how the principles of this invention can be applied to three dimensional configurations. A simplified open loop geometry is shown, having four mirrors 37. Total reflector 31 and output coupler 33 are arranged relative to optical path 19 and fold mirrors 37 so as to elevate the path with each successive reflection within the laser cavity.

Figure 8:
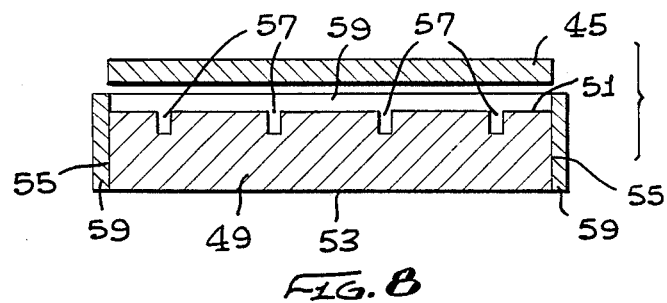
FIG. 8 is a cutaway elevation of the laser resonator structure taken along line 8—8 of FIG. 7.

FIG. 7 and FIG. 8 depict the preferred embodiment of laser resonator 47 within a waveguide gas laser system, which includes polygonal ceramic block 49, intersecting waveguides 57 formed in block 49, reflecting mirrors 59, with total reflecting mirror 63, and output coupler 61 "split coated" on single optical substrate 62.

A gaseous laser gain medium is contained in the waveguides. Any gas mixture capable of laser action is suitable for use as a gain medium in this multiply folded waveguide gas laser structure. Typical gases used for gas lasers include carbon dioxide, argon, and helium-neon. A waveguide CO2 laser is preferred, using a mixture of xenon, carbon dioxide, nitrogen, and helium in typical proportions of 5-10-20-65%.

When a rectangular optical path pattern is used, opposing vertical outer surfaces 55 of ceramic block 49 are parallel. Reflecting mirrors 59 are mounted adjacent to and parallel to vertical outer surface 55 of block 49. The incident angle on the second fold mirror preferably is complementary to the incident angle on the first fold mirror, to produce a regular and evenly spaced optical path. In the case of modules obtained by stacking square minims, waveguides 57 are located at 45 degrees and 135 degree angles relative to reflecting mirrors 59, with light reflected ninety degrees upon each incidence with a reflecting mirror.

Higher power output can be generated by serially connecting more than one laser resonator 47, while using only one output coupler 61 and one mirror 63, or by using one laser resonator 47 serially connected to one or more amplifier stages. Such stages may be standard amplifiers, or may make use of the multiply folded design of this invention. Use of the present design for amplification requires the substitution of anti-reflection coated windows in place of the output coupler 61 and mirror 63.

Ceramic block 49 is composed of a solid ceramic such as aluminum oxide or beryllium oxide. Block 49 has first horizontal surface 51 substantially parallel to second horizontal surface 53, and four vertical outer surfaces 55. Block 49 contains a series of intersecting waveguides 57. The waveguides may be cut into first horizontal surface 51 of the block, or may be drilled in the block (not shown). Rather than the flat waveguide grooves 57 depicted in FIG. 7 and FIG. 8, waveguides with circular cross-sections may be used which are drilled into block 49. Waveguides having circular cross-sections make alignment easier and result in a more stable laser radiation mode structure. However, circular grooves are more difficult to machine, since the grooves are drilled at acute angles relative to outer surfaces 55.

Lasers with longer optical path lengths (and therefore more power) can be obtained not only by machining larger blocks, but also by stacking smaller blocks. At the points where the waveguides intersect, negligible intracavity diffraction losses are introduced. Waveguide cross-sections are preferably on the order of 2.5 mm, and the distance between intersections is at least 2.5 times the waveguide cross-section.

Figure 9:
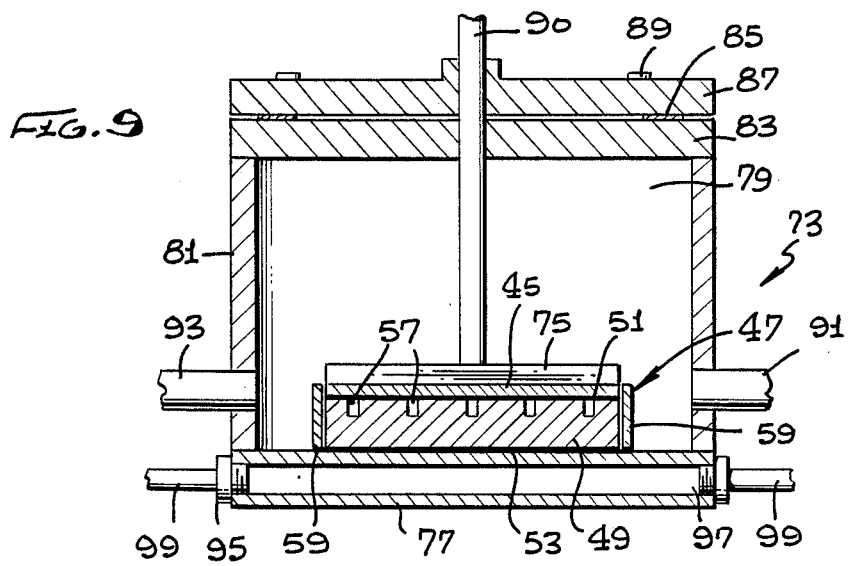
FIG. 9 is a cutaway elevation of the sealed laser head.

Reflecting mirrors 59, and substrate 62 are adjacent to vertical outer surfaces 55. Reflecting mirrors 59 and substrate 62 may be integrally attached to block 49, as shown in FIG. 8. Alternatively, the reflecting mirrors may be permanently mounted a small distance from the block, leaving a small gap (0.2 to 5 mm) for gas flow (as shown in FIG. 9). A spacer may be inserted between block 49 and substrate 62 to ensure a uniform distance between these elements.

In general, reflecting mirrors 59 are substantially parallel to vertical outer surfaces 55. However, other means of reflection such as diffraction gratings or prisms may be used. Generally, the gratings or prisms will not be parallel to the vertical outer surfaces, thereby increasing the size of laser resonator 47. However, the use of the gratings or prisms allows the laser output radiation to be tuned.

Since the multiple folded cavity leads to many incidences on reflecting mirrors 59, and each incidence results in some reflection losses, the use of high quality optics is critical. Reflection losses can be minimized with high quality surfaces such as enhanced silver or enhanced gold (99.8% reflectivity). Surfaces of lower reflectivity, such as diamond turned copper (99% reflectivity) become less suitable as the number of incidences upon the reflecting mirrors increases. Output coupler 61 permits a certain portion of the optical radiation in resonator 47 to escape (typically 5-25%) and reflects the remainder of the optical radiation to satisfy oscillation conditions in the gain medium.

The purpose of the folding mirrors is to connect optically adjacent waveguide chemicals with minimum losses. Standard state-of-the-art reflectors at 10.6 microns (CO2) wavelength include silicon substrates with enhanced and protected silver or gold coatings, with measured reflectivity (with a 45 degree angle of incidence) of 99.8% for s-polarization (parallel to the front surface of the mirror) and of 99.5% for p-polarization (perpendicular to the front surface of the mirror). In the absence of any other polarization determining element, this difference dictates laser operation in a fixed polarization with waveguides modules of ten nodes or more. Fixed polarization lasers are generally preferred to lasers with a random or varying plane of polarization. A typical folding mirror is 5 to 10 cm long, 6 mm long, and 6 mm thick.

The multiple reflections increase the difficulty of aligning the laser resonator. Although individual mirrors mounted at each node in a series of planes may be used (not shown), this multiplicity of mirrors causes alignment problems. The alignment problems are minimized by the use of a minimum number of reflecting mirrors 59, by having mirrors 59 and substrate 62 permanently mounted adjacent, or integrally attached, to block 49, and by locating more than one node on each mirror 59. Thus, the distance between waveguides 57 and these optics is minimized. This resonator design has several major advantages. First, the optical path outside the waveguide channels is negligible, reducing diffraction losses. Second, the total non-gain path is minimized. Third, permanently mounting reflecting mirrors 59, and substrate 62 enhances the stability, ruggedness, and portability of the resonator.

Output coupler 61 may be either germanium or zinc selenide (ZnSe) substrates. In waveguide CO2 lasers, where the intracavity power density may exceed 2 kW/square cm, ZnSe is preferred since germanium suffers from thermal runaway. The substrate is antireflection coated on the surface away from the ceramic waveguide, and coated for the appropriate reflectivity on the surface facing the ceramic waveguide. The reflectivity value depends upon the resonator length, resonator losses, and fill pressure, but is typically in the range of 75% to 95%. Typically, output coupler 61 and mirror 63 are about the same size; about 6–9 mm in diameter, and 3 mm thick. Mirror 63, output coupler 61, and folding mirror 59 are commercially available from Laser Optics, Inc.

Figure 10:
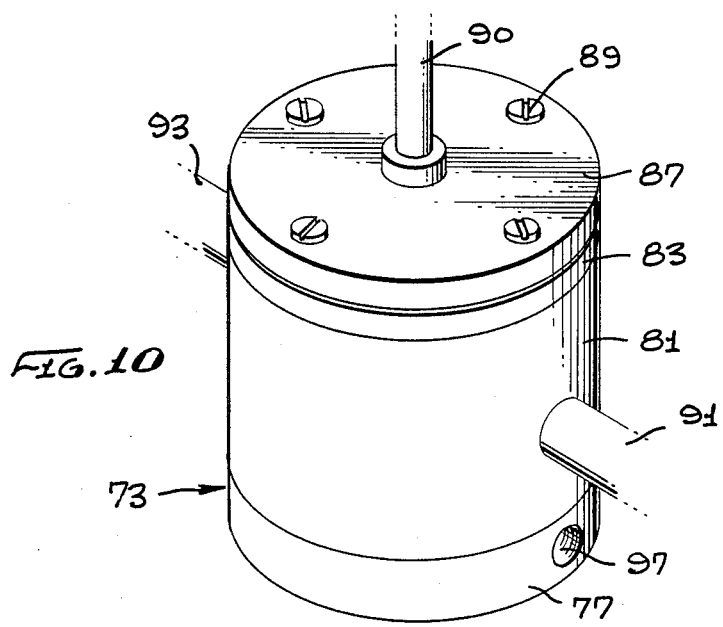
FIG. 10 is a perspective view of the sealed laser head shown in FIG. 9.

FIG. 9 and FIG. 10 depict a cutaway side view and a perspective view of the sealed laser head 73. Laser resonator 47, including reflecting mirrors 59 and ceramic block 49, is situated between first electrode 75 and second electrode 77. The electrodes shown in FIG. 9 are external electrodes, situated above and below first horizontal surface 51 and second horizontal surface 53 of block 49. Alternatively, the electrodes may be hybrid, with one electrode situated inside the laser resonator and one outside the laser resonator, or both electrodes may be situated inside the resonator. The external electrode configuration is preferred, since it removes metal electrodes from the active discharge region, thereby improving the life of the laser. A discharge between the electrodes excites the gain medium, creating a population inversion. The electrodes preferably receive power from a radio frequency generator, although other discharge sources may be used. laser resonator 47 and first electrode 75 are contained within sealed volume 79 defined by second electrode 77, walls 81, and flange 83. Only laser resonator 47 need be within the sealed volume. The gas mixture in sealed volume 79 can flow into and out of waveguides 57 through gaps between reflecting mirrors 59 and ceramic block 49 (as shown in FIG. 9). Also, the gas mixture can be fully sealed in laser resonator 47, without the use of a larger sealed volume.

Insulated RF power feed through 90 is connected to first electrode 75. Sealed volume 79 is closed by flange 83, gasket 85, and sealing cap 87 which may be tightened against flange 83 with sealing bolts 89. Sealing bolts 89 permit access to laser resonator 47 for replacement or adjustment.

Walls 81, electrodes 75 and 77, flange 83, and sealing gap 87 are preferably made of stainless steel. Gasket 85 is made of a malleable material, such as copper. FIG. 10 shows a cylindrical laser head 73, which uses stainless steel tubing for walls 81. Second electrode 77 seals volume 79 at one end, and flange 83, gasket 85, and sealing cap 87 close volume 79 at the opposite end of the cylinder.

A flat ceramic plate 45 may be inserted between block 49 and first electrodes 75, to provide all-ceramic waveguide channels. This will remove metal electrodes from the active discharge region, thereby improving electrode life. Also the ceramic plate acts as a proper capacitive ballast to the RF discharge.

Optical output port 91 and gas fill port 93 are attached to walls 81. Optical output port 91 and output coupler 63 (see FIG. 7) are aligned to minimize loss of power. Alternatively, block 49 may be mounted within sealed laser head 73 so that output coupler 63 is situated in optical output port 91. Gas fill port 93 may be of the pinch off type, or may be of a stopcock type for repetitive use where frequent exchanges of the gaseous laser gain medium are necessary.

Power transferred from the RF discharge of the electrodes to ceramic block 49 causing heating of the block. This heat can cause instability and lower power output of the laser. The use of ceramic material with a high heat transfer capability, such as BeO, enhances the dissipation of heat transfer from block 49.

In FIG. 9, block 49 is placed in contact with second electrode 77, which serves as a cooling plate. At typical laser efficiencies of about 10%, most of the RF power applied to the lasing gas mixture is converted into heat. Successful laser operation requires that this heat be removed from the gas mixture through ceramic block 49 by means of a suitable cooling system. Heat transferred from block 49 to second electrode 77 is dissipated with a fluid cooling system. The cooling system includes tubing 99 connected to cooling fluid inlet 95 and cooling fluid outlet 97, permitting flow of a cooling fluid through a cavity in second electrode 77. Also, block 49 may be cooled through cavities formed in block 49, with the fluid circulating directly through block 49.

The ceramic block 49 fulfills the dual role of insulating the spacer between top RF electrode 75 and bottom RF groundplate 77, and of cooling the interface between the hot laser plasma and the bottom cooling plate. Beryllia is the preferred ceramic because of its high thermal conductivity, even though it is toxic in powder form. Beryllia is readily available and can be easily fabricated into waveguide grids. High purity alumina (98.5% or higher) may be used in low power applications at reduced thermal loads.

A prototype laser resonator has been built using a 98.5% beryllia ceramic block with intersecting waveguides, and machined into a M(3.5, 4) open loop structure. The structure has 13 nodes (R), 21 crossings (C), "a" and "b" are each equal to 0.75 inches (square minims), and the path length (L) is 29.7 inches. Three of the fold mirrors are 1.75 inches long, 0.25 inches high, and 0.25 inches thick. The fourth mirror is 2.75 inches liong, with the same height and thickness. All four mirrors are precisely located around the perimeter of the block at a spacing of 0.010 inches from the vertical outer surface of the block. Mirror reflectivity is measured at 99.7% per reflection for s-polarization. A beryllia plate is used as a top cover. The ceramic block and the fold mirror assembly rest on an aluminum plate serving as a ground electrode and cooling plate, and carrying a serpentine cooling water channel. The laser cavity is filled with a mixture of CO2, nitrogen, and helium mixture (1:1:3.8) with 5% of added xenon. At a fill pressure of 70 Torr, with output coupler reflectivity of 80% and RF power input of 300 watts, a continuous wave output power of 22 watts is achieved.

Although only geometries involving three and four reflecting mirrors have been discussed herein, it is clear that the principles of this invention are applicable to more sophisticated polygonal structures, involving ether two or three dimensional configurations. Similarly, although much of this disclosure has involved waveguide lasers, the principles of this invention are applicable to non-waveguide gas laser systems, such as free space mode lasers.

Accordingly, there has been provided in accordance with the invention, a multiply folded gas laser resonator that fully satisfies all of the objectives set forth above. It is understood that all terms used herein are descriptive rather than limiting. While the invention has been described in conjunction with specific embodiments, it is evident that many alternatives, modifications, and variations will be apparent to those skilled in the art in light of the disclosure herein. Accordingly, it is intended to include all such alternatives, modifications, and variations that fall within the spirit and scope of the appended claims.

I claim:

1. A laser resonator which lengthens the optical path of laser radiation in a laser cavity, comprising:
    a gas medium capable of supporting laser action located within the laser cavity;
    means for supplying power to the laser cavity;
    means for removing heat from the laser cavity;
    a polygonal block in the cavity, the block having at least three outer surfaces, and the block having grid of intersecting waveguide channels formed therein; and
    reflection means comprising a plurality of mirrors, at least one mirror being located along three of the outer surfaces of the block, the mirrors and the grid cooperating to define a folded optical path within the laser cavity, whereby the folded optical path contains a series of crossing paths within the grid.

2. The laser resonator of claim 1, further comprising:
    a flat plate covering the block, the plate combining with the block to surround the folded optical path within the laser cavity.

3. The laser resonator of claim 1, wherein the mirrors are coated to front reflect optical radiation.

4. The laser resonator of claim 1, wherein the means for supplying power to the electrodes comprises a radio frequency power supply.

5. The laser resonator of claim 1, further comprising;
    a total reflector located adjacent to the reflecting means; and
    an output coupler, located adjacent to the reflecting means, through which laser radiation escapes from the laser cavity.

6. The laser resonator of claim 5, wherein the output coupler and the total reflector are formed on adjacent areas of a single optical substrate.

7. The laser resonator of claim 1, further comprising;
    two antireflection coated windows, each window being located adjacent to the reflecting means.

8. A laser resonator which lengthens the optical path of laser radiation in a cavity, comprising:
    a gas medium capable of supporting laser action located within the laser cavity;
    means for supplying power to the laser cavity;
    means for removing heat from the laser cavity;
    a plurality of mirrors located within the cavity, including a first mirror, a second mirror, and at least one remaining mirrors, the mirrors forming a substantially rectangular area, each of the mirrors being coated to front reflect laser radiation;
    means for directing the laser radiation within the laser cavity into each of the mirrors, a first angle being formed between the laser radiation and the first mirror, a second angle being formed between the laser radiation reflected from the first mirror into the second mirror, the first mirror being substantially perpendicular to the second mirror, and a folded optical path being formed within the rectangular area.

9. The laser resonator of claim 8, further comprising:
    a rectangular block located within the rectangular area, the block having a grid of intersecting waveguide channels, and the grid cooperating with the mirrors to define the folded optical path.

10. The laser resonator of claim 8, wherein the first angle is complementary to the second angle.

11. The laser resonator of claim 8, wherein the folded optical path forms a closed loop.

12. The laser resonator of claim 8, further comprising;
    a total reflector located adjacent to the rectangular area; and
    an output coupler located adjacent to the rectangular area, through which laser radiation escapes from the laser cavity.

13. The laser resonator of claim 12, wherein the output coupler and the total reflector are formed on a single optical substrate.

14. The laser resonator of claim 8, further comprising;
    two antireflection coated windows, each of the windows being located adjacent to the rectangular area.

15. The laser resonator of claim 8, wherein the folded optical path forms an open loop.

16. A laser resonator which lengthens the path of laser radiation within a laser cavity, comprising:
    a gaseous medium capable of supporting laser action located within the cavity;
    means for supplying power to the laser cavity;
    means for removing heat from the laser cavity;
    a plurality of mirrors located within the cavity, each of the mirrors being front coated to reflect the laser radiation; and
    means for directing the laser radiation within the laser cavity into each of the mirrors, forming a three-dimensional folded optical path, the path wrapping around the cavity, the elevation of the path progressively changing with each successive reflection from each of the mirrors.

17. A process for lengthening an optical path within a laser cavity comprising:
    providing a plurality of mirrors within the cavity along a series of planes, including a first mirror, and a second mirror, the planes forming and surrounding a substantially polygonal area, the polygonal area having at least three sides, at least one mirror being located along three of the sides of the polygonal area, each of the mirrors being coated to reflect front surface optical radiation;
    aligning the mirrors within the laser cavity;
    generating laser radiation as power is supplied for the laser cavity;
    directing the laser radiation along a folded optical path within the polygonal area into at least one mirror on each of the planes, a first angle being formed between the laser radiation and the first mirror, a second angle being formed between the laser radiation reflected from the first mirror into the second mirror and the second mirror, the folded optical path being defined by the configuration of the planes.

18. The process of claim 17, further comprising:
providing a polygonal block within the polygonal area, the block having a grid of intersecting waveguide channels formed therein, wherein the mirrors and the grid cooperate to define the folded optical path.

19. The process of claim 17, wherein power is supplied to the laser cavity by electrodes.

20. The process of claim 17, wherein power is supplied to the laser cavity by a radio frequency power supply.

21. The process of claim 17, wherein the laser cavity is located within a laser oscillator.

22. The process of claim 17, wherein the laser cavity is located within a laser amplifier.

23. The process of claim 17, wherein the reflecting mirrors are arranged in a substantially rectangular configuration.

24. The process of claim 23, wherein the first angle is complementary to the second angle.

25. A laser resonator which lengthens the optical path of laser radiation in a laser cavity, comprising:
a gas medium capable of supporting laser action located within the laser cavity;
means for supplying power to the laser cavity;
means for removing heat from the laser cavity;
a polygonal block in the cavity, the block having at least three outer surfaces, and the block having a grid of intersecting waveguide channels formed therein; and
reflection means comprising a plurality of mirrors, each mirror located along an outer surface, the mirrors and the grid cooperating to define a folded optical path within the laser cavity, whereby the folded optical path contains a series of crossing paths within the grid.

26. The laser resonator of claim 25, further comprising:
a flat plate covering the block, the plate combining with the block to surround the folded optical path within the laser cavity.

27. The laser resonator of claim 25, wherein the mirrors are front coated to front reflect optical radiation.

28. The laser resonator of claim 25, wherein the means for supplying power to the electrodes comprises a radio frequency power supply.

29. The laser resonator of claim 25, further comprising:
a total reflector located adjacent to the reflecting means; and
an output coupler, located adjacent to the reflecting means, through which laser radiation escapes from the laser cavity.

30. The laser resonator of claim 29, wherein the output coupler and the total reflector are formed on adjacent areas of a single optical substrate.

31. The laser resonator of claim 25, further comprising:
two antireflection coated windows, each window being located adjacent to the reflecting means.

* * * * *